(12) United States Patent
Chen et al.

(10) Patent No.: US 8,573,130 B2
(45) Date of Patent: Nov. 5, 2013

(54) GAS GENERATOR

(75) Inventors: Jianlin Chen, Kiyosu (JP); Akimitsu Tanaka, Kiyosu (JP); Yoshitaka Kashitani, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/245,042

(22) Filed: Sep. 26, 2011

(65) Prior Publication Data

US 2012/0079959 A1 Apr. 5, 2012

(30) Foreign Application Priority Data

Sep. 30, 2010 (JP) ................................. 2010-220990

(51) Int. Cl.
*B60R 21/26* (2011.01)
(52) U.S. Cl.
USPC .................. 102/530; 102/202.9; 102/202.14; 280/741; 280/736
(58) Field of Classification Search
USPC ......... 102/202.1, 202.9, 202.12, 202.14, 530, 102/531; 280/741, 736
See application file for complete search history.

(56) References Cited

U.S. PATENT DOCUMENTS

| | | | |
|---|---|---|---|
| 6,073,963 A | | 6/2000 | Hamilton et al. |
| 6,979,021 B2 * | | 12/2005 | Young et al. ................ 280/737 |
| 7,111,558 B2 * | | 9/2006 | Brede et al. ................ 102/202.9 |
| 7,125,041 B2 | | 10/2006 | Kato et al. |
| 7,210,703 B2 * | | 5/2007 | Young et a ................ 280/741 |
| 8,459,694 B2 * | | 6/2013 | Chen et al. ................ 280/741 |
| 2002/0135172 A1 * | | 9/2002 | Koga ................ 280/741 |
| 2007/0096451 A1 * | | 5/2007 | Stevens ................ 280/806 |
| 2010/0071581 A1 | | 3/2010 | Asanuma et al. |

FOREIGN PATENT DOCUMENTS

| | | |
|---|---|---|
| JP | A-11-321541 | 11/1999 |
| JP | A-2002-239371 | 8/2002 |
| JP | A-2004-217059 | 8/2004 |
| JP | A-2006-1778 | 1/2006 |
| JP | A-2008-290528 | 12/2008 |
| JP | A-2010-76582 | 4/2010 |
| JP | A-2010-173559 | 8/2010 |

OTHER PUBLICATIONS

Office Action dated Jan. 25, 2013 in corresponding JP Application No. 2010-220990 (and English translation).

* cited by examiner

*Primary Examiner* — James Bergin
(74) *Attorney, Agent, or Firm* — Posz Law Group, PLC (57) ABSTRACT

A gas generator includes a housing body for housing a gas generating charge, a squib for igniting the gas generating charge and a holder section that holds the squib. The holder section includes a holder body made of metal and a molded section that is molded from synthetic resin and located between the holder body and the squib. The squib and the holder body are integrally molded with the molded section at molding of the molded section. The holder section includes a support section that protrudes inwardly to support an igniter of the squib. The support section is covered by the molded section all over the outer surface and has such a sectional contour as to taper toward the leading end as taken along an axial direction of the housing body.

5 Claims, 4 Drawing Sheets

Fig. 4

GAS GENERATOR

CROSS REFERENCE TO RELATED APPLICATIONS

The Present application claims priority from Japanese Patent Application No. 2010-220990 of Chen et al., filed on Sep. 30, 2010, the disclosure of which is hereby incorporated into the present application by reference.

BACKGROUND OF THE INVENTION

1. Field of the Invention

The present invention relates to a gas generator which includes a housing filled with a gas generating charge for generating a combustion gas and a squib for igniting the gas generating charge.

2. Description of Related Art

JP 2004-217059 A discloses a conventional gas generator which includes a tubular housing body that houses a gas generating charge, a squib for igniting the gas generating charge and a holder section that holds the squib. The holder section includes a holder body made from metal and a molded section which is located between the holder body and the squib and made from synthetic resin. The holder body includes an outer cylinder section that covers an outer circumference of the molded section and a protruding section that protrudes inwardly from an end region of the outer cylinder section on the side of the gas generating charge and is formed along an entire circumferential direction of the outer cylinder section continuously. The molded section includes a generally tubular cover section that covers conductive pins of the squib which protrude from the protruding section in an interior of the outer cylinder section, and a set-in portion that is located on the side of the gas generating charge relative to the protruding section and covers an outer circumference of an igniter of the squib in a closely contacting fashion. The protruding section is covered by the molded section all over.

That is, in the conventional gas generator, the protruding section of the holder body has an outer contour like a generally doughnut disc, and the molded section located between the holder body and the squib has such an outer contour that is constricted partially according to the contour of the protruding section. Further, the protruding section has a generally uniform thickness in a sectional contour as taken along an axial direction of the housing body as referred to FIG. 2 of the above prior art reference. Such contours of the protruding section and molded section form narrow regions in a cavity of a mold used to mold the molded section, e.g., between the igniter and protruding section, between an opening formed on the protruding section and the conductive pins of the squib, etc. At molding of the molded section, a molten synthetic resin is fed into a mold from a gate formed at either one end face in an axial direction of the housing body to flow through the narrow regions of the cavity. The narrow regions are likely to cause problems in resin flow and resultant defective moldings.

SUMMARY OF THE INVENTION

An object of the present invention is to solve the above problem and provide a gas generator that can prevent defective moldings and work in a steady fashion although a holder body and a squib is integrated with a molded section.

The object of the invention will be achieved by a gas generator including:

a housing body that houses a gas generating charge, the housing body being made from metal and generally tubular in contour;

a squib that includes an igniter facing towards the gas generating charge for igniting the gas generating charge in order to generate a combustion gas and a pair of conductive pins extending generally along an axial direction of the housing body from the igniter; and a holder section that holds the squib and includes:

a holder body made of metal and including an outer cylinder section that is generally tubular in contour and constitutes an outer circumferential region of the holder section, and a support section that protrudes inwardly from an entire inner circumference of the outer cylinder section in a continuous manner for supporting the igniter of the squib, the support section having such a sectional contour as to taper toward a leading end thereof as taken along the axial direction of the housing body; and a molded section that is located between the holder body and the squib and covered by the outer cylinder section of the holder body, the molded section being molded from synthetic resin to be integral with the holder body and the squib, and covering an outer surface of the support section all over and including:

a set-in portion that holds the igniter and covers an outer circumference of the igniter generally all over in a closely contacting fashion except a region of the igniter facing towards the gas generating charge; and a cover section that is located on an opposite side of the set-in portion relative to the support section and generally tubular in contour, the cover section covering the conductive pins on an outside of the pins in a direction perpendicular to the axial direction of the housing body.

In the gas generator of the invention, the holder body is provided with the support section that protrudes inwardly from an entire inner circumference of the outer cylinder section in a continuous manner for supporting the igniter of the squib, and the support section has such a sectional contour as to taper toward the leading end as taken along the axial direction of the housing body. This configuration will help secure a greater clearance between the support section and igniter at integral molding of the molded section together with the squib and holder body, in comparison with an instance where a thickness of the support section is uniform over an entire length. This will facilitate a resin fed into a mold from a gate located at one end face in an axial direction of the housing body to flow through narrow regions of a cavity, e.g., between the support section and igniter, between the leading end of the support section and the conductive pin and so on, thereby lessening defective moldings as much as possible. The tapering contour of the support section and the greater clearance hence formed between the support section and igniter will allow an opening formed on the support section to be minified in comparison with an instance where the thickness of the support section is uniform over an entire length. In other words, the support section will be allowed to protrude inwardly as much as possible. Accordingly, the support section thus constructed from metal will securely support the igniter of the squib which will attempt to move away from the gas generating charge by a reaction at actuation.

Therefore, the gas generator of the invention can prevent defective moldings as much as possible and work in a steady fashion in spite of the integral construction of the molded section, the holder body and the squib.

In the above gas generator, if the housing body includes an annular abutting portion facing toward the holder section for abutment against and coupling with the holder section, it is desired to provide a flange at a location of the molded section overlapping with the support section in the axial direction of the housing body and proximate the set-in portion such that the housing body is coupled with the holder section by coupling means that presses the annular abutting portion towards the holder section along the axial direction of the housing body so as to make a plane of the annular abutting portion facing toward the holder section abut against a plane of the flange facing toward the gas generating charge over entire circumferences.

With this configuration, if an intense pressure is applied to the flange when coupling the housing body and the holder section by pressing the annular abutting portion towards the holder section, the flange is merely elastically deformed in comparison with the holder body or annular abutting portion. That is, even if the flange is deformed when pressed by the annular abutting portion, it restores after coupling in such a manner as to fill a clearance between the flange and annular abutting portion, while keeping the coupled state by the coupling means, thereby preventing a clearance from being formed between the annular abutting portion and flange as much as possible. Furthermore, since the support section, the annular abutting portion and flange are so disposed as to overlap one another in the axial direction of the housing body, the flange is supported by the support section. This configuration will help prevent the flange from being pressed excessively by the pressure that presses the annular abutting potion at coupling of the holder section and housing body by the coupling means.

That is, the flange acts like an O-ring, such that a clearance or a gap is not likely to be formed between the flange and the annular abutting portion of the housing body or between the flange and support section of the holder section, and therefore a gap is not likely to be formed between the holder section and the housing body, thereby improving sealedness of the gas generator. As a result, the gas generator of the invention is capable of shutting out moisture and keeping the gas generating charge in good combustible condition for an extended time period.

In the gas generator configured as above, moreover, it is desired that:

a thickness of a basal portion of the support section in the axial direction of the housing body is greater than a thickness of the flange in the axial direction of the housing body; and the coupling means is comprised of a caulking section that extends from a vicinity of the support section of the holder body and caulked to the housing body, the caulking section covering a back face of an outer periphery of the annular abutting portion generally all over and be pressed against the back face along the axial direction of the housing body so as to overlap with the annular abutting section in the axial direction of the housing body.

With the above configuration, the housing body is coupled with the holder section securely by the caulking section, and the caulking section is easily formed by providing on the holder section a caulkable portion extending from the vicinity of the support section and arranging the caulkable portion to cover the back face of the outer periphery of the annular abutting section generally all over and caulking or pressing the caulkable portion along the axial direction of the housing body. No high dimensional accuracy will be required for coupling of the housing body with the holder section, thereby enabling to manufacture the gas generator at low cost. Furthermore, since the thickness in the axial direction of the housing body of the basal portion of the support section is greater than that of the flange, the support section supports the flange in a steady fashion when coupling the housing body and holder section together by the caulking section.

Furthermore, if the support section is so slanted as to turn a leading end toward the gas generating charge, the basal portion of the support section for supporting the flange will be allowed to be located away from the gas generating charge in comparison with an instance where the support section is formed to extend perpendicularly to the axial direction of the housing body. Accordingly, the caulking section will also be allowed to be located away from the gas generating charge (i.e., to the conductive pins) relative to an instance where the support section is formed to extend perpendicularly to the axial direction of the housing body. That is, the length of the holder body in the axial direction of the housing body can be shortened.

The gas generator of the invention will be suitably used as an actuator for use in such an inflator that a combustion gas generated by combustion of a gas generating charge is to collapse a burst disc, since the support section is capable of supporting an igniter of a squib steadily.

DESCRIPTION OF PREFERRED EMBODIMENTS

Preferred embodiments of the present invention are described below with reference to the accompanying drawings. The embodiments are described as applied to a gas generator used as an actuator for a hybrid inflator 1 for supplying an inflation gas to an airbag. However, the invention is not limited to the embodiments disclosed herein. All modifications within the appended claims and equivalents relative thereto are intended to be encompassed in the scope of the claims. In this embodiment, unless otherwise specified, an up and down direction is intended to refer to a direction extending along an axial direction of a later-described gas vessel 3 of the inflator 1 (i.e., an axial direction of a later-described cup 18 of an actuator S1). More specifically, an up direction is intended to refer to a direction where an end cap section 4 is located in the inflator 1 (or a direction where the cup 18 is located, in the actuator S1) and a down direction is intended to refer to a direction where a squib 13 is located in the actuator S1.

Figure 1:
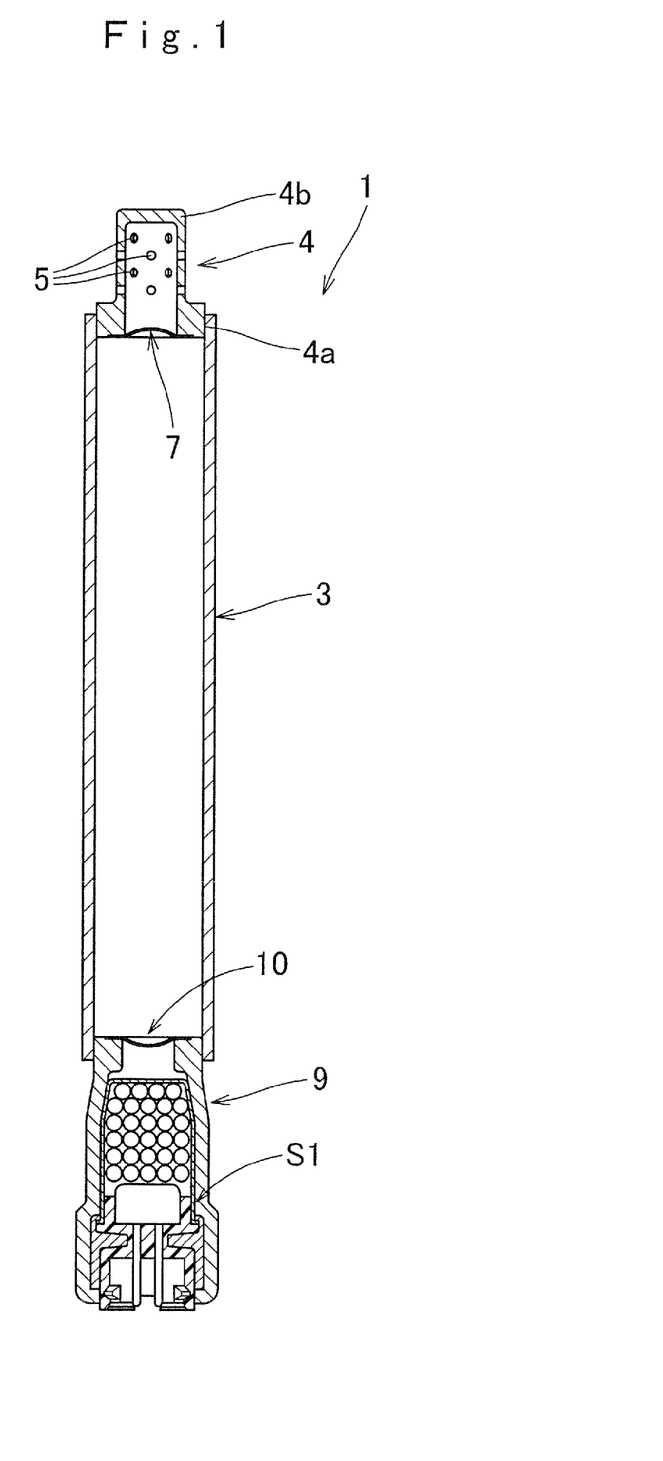
FIG. 1 is a schematic vertical section of an inflator provided with an actuator or a gas generator embodying the invention.

The inflator 1 shown in FIG. 1 is generally columnar in outer contour and includes a generally columnar gas vessel 3, an end cap section 4 located at a first end (or an upper end) of the gas vessel 3 and a gas generator in the form of an actuator S1 located at a second end (or a lower end) of the gas vessel 3. The end cap section 4 is provided with gas discharge apertures 5.

The gas vessel 3 is made of a steel pipe which is open at opposite ends in an axial direction. The first end (or upper end) is closed by the end cap section 4 whereas the second end (or lower end) is closed by a casing 9 that houses the actuator S1. The gas vessel 3 contains such a gas as nitrogen gas, helium gas, argon gas or a mixture of such gases, under pressure.

The end cap section 4 is made from such metal as steel. The end cap section 4 is welded and secured to the gas vessel 3 by the periphery of the basal (or lower end) portion 4a and closes off the first end or upper end of the gas vessel 3 as shown in FIG. 1. The end cap section 4 is provided with a plurality of gas discharge apertures 5 on the leading end (upper end) portion 4b. In this specific embodiment, the leading end portion 4b is smaller in diameter than the basal portion 4a and is provided with numbers of the gas discharge apertures 5 along an entire circumference thereof.

The end cap section 4 further includes in the basal portion 4a a burst disc 7 that partitions the end cap section 4 from the gas vessel 3 in such a manner as to close the gas discharge apertures 5 as shown in FIG. 1. The burst disc 7 is designed to collapse when an inner pressure of the gas vessel 3 is boosted. The inner pressure of the gas vessel 3 is boosted when the actuator S1 is actuated, a later-described gas generating charge 15 contained in the cup 18 of the actuator S1 is burned and generates a combustion gas, and the combustion gas flows into the gas vessel 3 and heats the pressurized gas contained in the gas vessel 3. Collapse of the burst disc 7 triggers gas communication between the gas vessel 3 and end cap section 4, and allows an inflation gas to exit from the gas discharge apertures 5.

Figure 2:
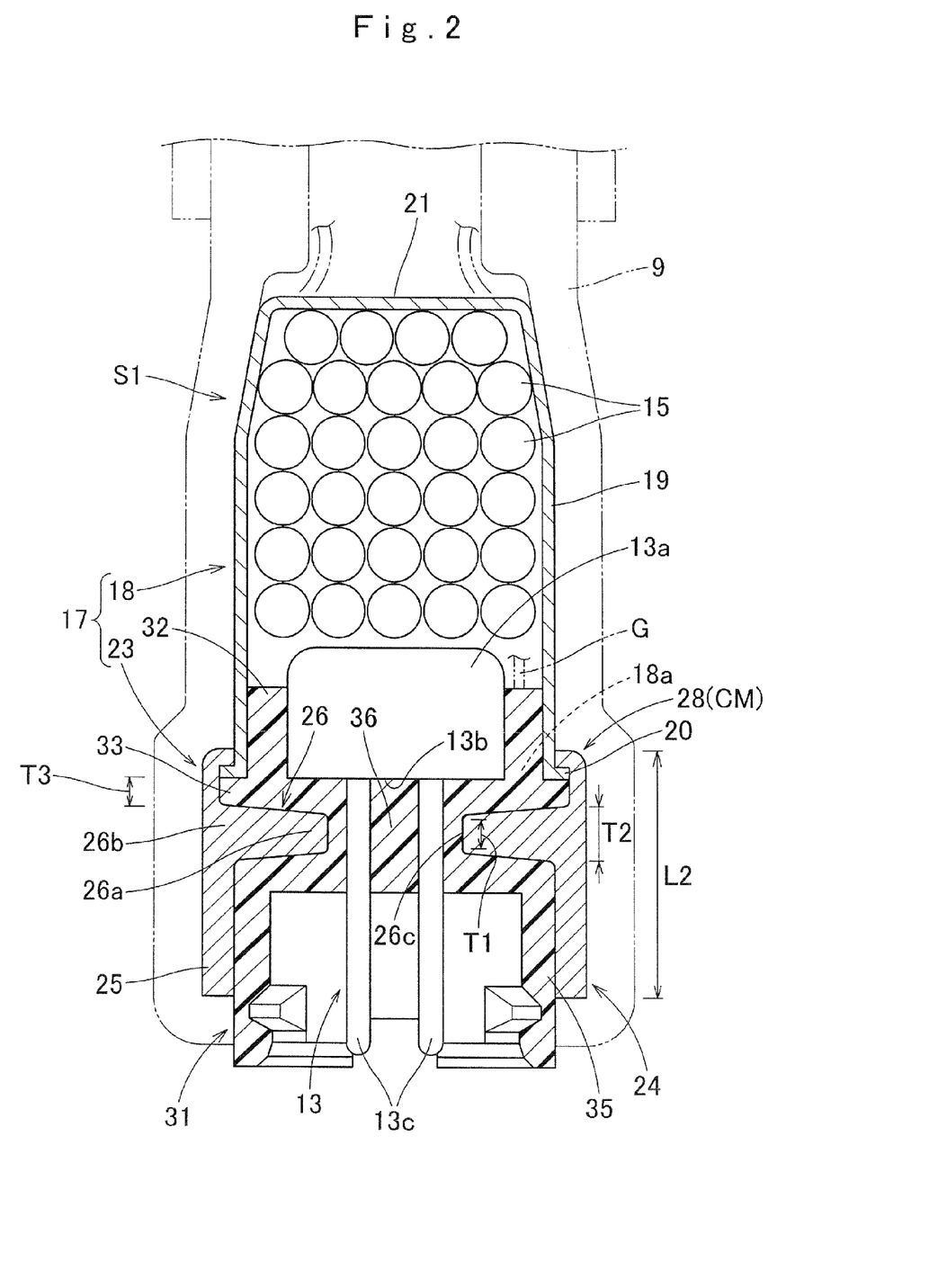
FIG. 2 is a partial enlarged section of the actuator of FIG. 1.

Referring to FIGS. 1 and 2, the actuator S1 acting as a gas generator is housed in the casing 9 that is so arranged as to close off the second end or lower end of the gas vessel 3. The casing 9 is fabricated of such metal as steel, generally in the form of a cylinder open at opposite ends. In this specific embodiment, the lower end region of the casing 9 for housing a later-described holder section 23 of the actuator S1 is greater in diameter than an upper end region. The casing 9 is pressed against and caulked to a later-described holder body 24 of the actuator S1 by the lower end region, thus holding the actuator S1. On an end of the casing 9 on the side of the gas vessel 3 (i.e., on the upper end of the casing 9) is a burst disc 10 in such a manner as to partition the actuator S1 from the gas vessel 3. The burst disc 10 is designed to collapse when an inner pressure of the casing 9 is boosted. The inner pressure of the casing 9 is boosted when areas in between later-described tearable portions on a later-described ceiling wall 21 of the cup 18 open at actuation of a squib 13 of the actuator S1 and a combustion gas generated by combustion of the gas generating charge 15 fills a space inside the casing 9. Collapse of the burst disc 10 triggers gas communication between the actuator S1 and gas vessel 3 and allows the combustion gas generated by combustion of the gas generating charge 15 to flow into the gas vessel 3.

As shown in FIG. 2, the actuator S1 includes a housing 17 filled with a gas generating charge 15 and a squib 13 that is housed in the housing 17 for igniting the gas generating charge 15.

The squib 13 is held by a later-described holder section 23 and housed inside the housing 17. The squib 13 includes an igniter 13a facing towards the gas generating charge 15 for igniting the charge 15 and a pair of conductive pins 13c extending downward from the igniter 13a along an axial direction of the cup or housing body 18. The squib 13 is so arranged that the top face of the igniter 13a is exposed to an interior of the cup 18 (i.e., toward the gas generating charge 15) whereas the conductive pins 13c are exposed downward, i.e., to an exterior of the housing 17. The squib 13 is held by a later-described molded section 31 by the circumference thereof. The molded section 31 is molded by insert molding using the squib 13 and a later-described holder body 24 as inserts, such that the squib 13 is integral with the holder section 23. The igniter 13a contains an unillustrated igniter charge. When an electric current is passed through the conductive pins 13c, the igniter charge is ignited and builds a fire from the igniter 13a, and the fire burns the gas generating charge 15 housed in the cup 18 of the housing 17.

The housing 17 includes a cup 18 acting as the housing body, a holder section 23 that holds the squib 13, and means CM for coupling the cup 18 and holder section 23 together, which will be called as the "coupling means CM" herein below. The cup 18 is made of metal and houses the gas generating charge 15.

The gas generating charge 15 is a molded product of a predetermined combustible agent for producing a combustion gas, and fills the housing 17 as referred to FIG. 2. In the illustrated embodiment, the gas generating charge 15 is located in a void space between the cup 18 located above the squib 13 and the molded section 31 of the holder section 23.

The cup 18 acting as the housing body is formed into a bottomed cylindrical cup, in this specific embodiment. The cup 18 includes a circumferential wall 19 extending from the holder section 23 in a generally cylindrical shape and a ceiling wall 21 which is formed into a generally disc-like shape closing an end of the circumferential wall 19 facing away from the holder section 23 (i.e., the upper end of the circumferential wall 19). In a periphery of an opening 18a of the cup 18, which is located at the lower end of the circumferential wall 19, facing toward the holder section 23, is an annular abutting portion 20 which protrudes outwardly in a flange-like fashion. The cup 18 of this specific embodiment is made of such metal as aluminum alloy, and is coupled with the holder section 23 with the annular abutting portion 20 abutted against a later-described flange 33 of the molded section 31 of the holder section 23 whereas a later-described caulking section 28 acting as the coupling means CM and extending from the holder body 24 caulked to a back face (or top face) 20b (FIG. 3) of an outer periphery of the annular abutting portion 20 all over. In this specific embodiment, the bottom face (or leading end face) 20a of the annular abutting portion 20 generally conforms to the bottom face 13b of the igniter 13a of the squib 13 in location in an up and down direction, as referred to FIG. 3. An inner diameter of the circumferential wall 19 of the cup 18 is slightly greater than an outer diameter of a later-described set-in portion 32 of the molded section 31 so as to accommodate the set-in portion 32. The ceiling wall 21 is provided with thinned tearable portions (not shown) which are designed to tear when the squib 13 is actuated. Although not shown, the tearable portions are formed into lines extending generally radially from the center of the ceiling wall 21. The tearable portions tear when the squib 13 is actuated so areas of the ceiling wall 21 in between the tearable portions open around a vicinity of a boundary of the circumferential wall 19 as indicated by double-dashed lines in FIG. 2, thereby allowing a gas produced by combustion of the gas generating charge 15 to exit to an interior of the casing 9 outside the cup 18.

The holder section 23 includes a holder body 24 made from metal and a molded section 31 which is made from synthetic resin and located between the holder body 24 and squib 13.

In this specific embodiment, the holder body 24 is made from aluminum alloy, stainless steel (SUS) or the like and includes an outer cylinder section 25 which is formed generally into a cylinder and constitutes an outer circumferential region of the holder section 23, and a support section 26 which is located in a vicinity of the upper end of the outer cylinder section 25 (i.e., in a vicinity of an end of the outer cylinder section 25 on the side of the cup 18). The outer cylinder section 25 covers an outer circumference of a portion of the molded section 31 below the support section 26 (specifically, an outer circumference of a later-described cover section 35 of the molded section 31). The length of the outer cylinder section 25 should be sufficient to protect the conductive pins 13c while being such length as to expose a lower end region of the cover section 35 of the molded section 31 such that the lower end region is elastically (i.e., restorably) deformable outwardly in a direction perpendicular to an axial direction of the outer cylinder section 25 when an unillustrated connector is connected thereto.

The support section 26 is located between the set-in portion 32 and cover section 35 of the molded section 31, and protrudes inwardly from the outer cylinder section 25 so as to support the igniter 13a of the squib 13. The support section 26 is formed along an entire circumferential direction of the outer cylinder section 25 continuously, extending generally along a direction perpendicular to the axial direction of the outer cylinder section 25. As shown in FIG. 2, taken along an axial direction of the outer cylinder section 25 (i.e., taken along an axial direction of the cup or housing body 18, namely along an up and down direction), the support section 26 has such a sectional contour as to taper toward the leading end 26a, and an area to the leading end 26a is located beneath the igniter 13a in such a manner as to support the igniter 13a. More specifically, the area to the leading end 26a of the support section 26 extends up to about ⅕ position of an outer diameter of the igniter 13a from the lateral of the igniter 13a. In the illustrated embodiment, the thickness T1 of the leading end 26a of the support section 26 is about ⅔ of the thickness T2 of a basal portion 26b as shown in FIG. 2.

That is, the support section 26 has a generally doughnut disc shape that gradually decreases in thickness toward the center and has a generally round opening 26c at the center. The conductive pins 13c of the squib 13 run through the opening 26c, and a region of the opening 26c except the conductive pins 13c is filled in with a later-described joint portion 36 of the molded section 31. As shown in FIG. 2, the thickness (i.e., the thickness in an up and down direction) T2 of the basal portion 26b of the support section 26 is greater than a thickness T3 of the flange 33 of the molded section 31 so as to support the flange 33 steadily. The outer surface of the support section 26 protruding from the outer cylinder section 25 is covered by the molded section 31 all over. A clearance or distance t1 (FIG. 3) between the support section 26 and igniter 13a, a clearance t2 (FIG. 3) between the leading end 26a of the support section 26 and the conductive pin 13c (or a diameter of the opening 26c) and a clearance t3 (FIG. 3) between the support section 26 and an inner surface of the cover section 35 of the molded section 31 are all determined at minimum dimensions that can assure smooth resin flow at molding of the molded section 31.

The holder body 24 further includes at the upper end (i.e., at the end on the side of the cup 18) a caulking section 28 that is so caulked as to cover a generally whole outer periphery of the annular abutting portion 20 of the cup 18 tightly. The caulking section 28 acts as the coupling means CM that couples the cup 18 and holder section 23 together.

Figure 3:
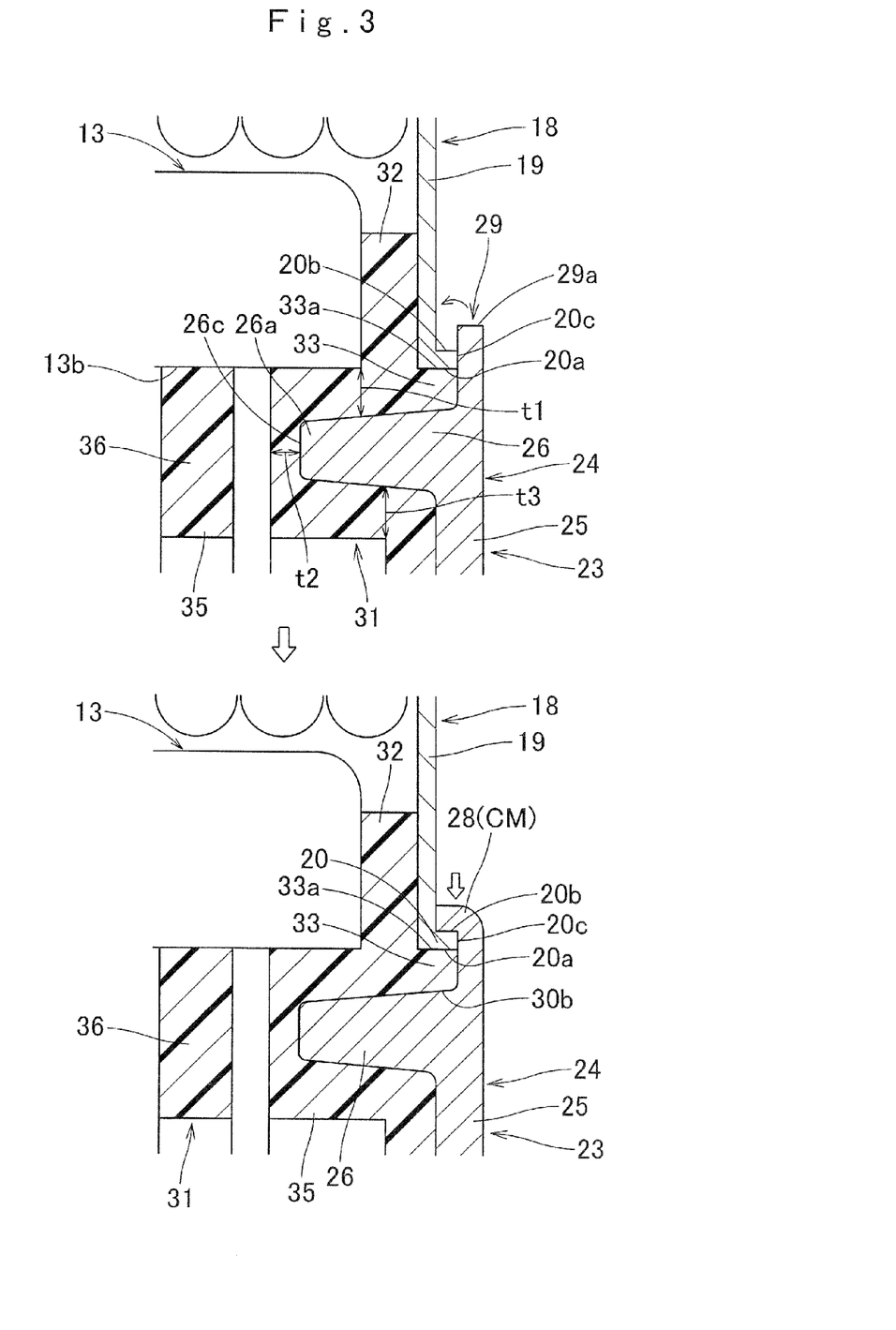
FIG. 3 is a partial enlarged section illustrating a caulking process of a caulking section.

The caulking section 28 extends from the support section 26. Before caulked, the caulking section 28 is prepared as a caulkable portion 29 that, as shown in FIG. 3, extends upward in a generally cylindrical fashion from an entire outer periphery of the top of the outer cylinder section 25. The outer circumference of the caulkable portion 29 aligns to that of the outer cylinder section 25. Caulking is conducted as follows: the cup 18 is placed on the holder section 23 such that the annular abutting portion 20 abuts against the flange 33 of the molded section 31. Then a leading end or upper end portion 29a of the caulkable potion 29 protruding upward relative to the annular abutting portion 20 is brought down toward an axial center of the cup 18, and a pressure is applied to thereto downward (toward the holder section 23, along an axial direction of the cup 18 or up and down direction), thereby forming the caulking section 28. The thickness of the caulkable portion 29 is thinner than that of the outer cylinder section 25. In the illustrated embodiment, the thickness of the caulkable portion 29 is about half of that of the outer cylinder section 25. The protruding distance (or length) of the caulkable portion 29 from the outer cylinder section 25 is such that can cover a whole area of the annular abutting portion 20 from the outer circumference 20c to the top face (or back face) 20b. Further, the inner diameter of the caulkable portion 29 is generally identical to an outer diameter of the annular abutting portion 20 so as to accommodate the annular abutting portion 20 therein and cover the outer circumference of the annular abutting portion 20 without forming a gap. Thus, when caulked, the caulking section 28 extends from the support section 26 and covers the annular abutting portion 20 entirely from the outer circumference to the top face (back face) 20b as well as the outer circumference of the flange 33 of the molded section 31, and overlaps with the annular abutting portion 20 in the axial direction of the cup 18 (i.e., in an up and down direction).

The molded section 31 lies between the holder body 24 and squib 13, and includes a set-in portion 32 that holds the igniter 13a of the squib 13, a cover section 35 that is located around the conductive pins 13c of the squib 13 and a joint portion 36 that bridges the set-in portion 32 and cover section 35.

The set-in portion 32 holds the igniter 13a while covering an outer circumference of the igniter 13a generally all over in close contact except the top face facing toward the gas generating charge 15. In this specific embodiment, the set-in portion 32 lies between the igniter 13a and circumferential wall 19 of the cup 18 and between the igniter 13a and support section 26, and covers an underside and an about ¾ area of the lateral from the bottom, of the igniter 13a, without forming a gap in between. As described above, the outer diameter of the set-in portion 32 is slightly smaller than the inner diameter of the circumferential wall 19 of the cup 18 so as to be accommodated in the cup 18.

Proximate the lower end (i.e., at the end on the side of the holder body 24) of the set-in portion 32 is a flange 33 which protrudes outwardly along an entire circumferential direction of the cup 18 for abutment against the annular abutting portion 20 of the cup 18. The outer diameter of the flange 33 generally conforms to that of the annular abutting portion 20, thus a top face 33a of the flange 33 abuts against the leading end face (or bottom face) 20a of the annular abutting portion 20 over an entire circumference (i.e., by whole area). In this specific embodiment, the top face 33a of the flange 33 generally conforms to the bottom face 13b of the igniter 13a in the squib 13 in position in an up and down direction, as shown in FIG. 3. The bottom face 33b of the flange 33 is supported by the support section 26 of the holder body 24 over an entire circumference (i.e. by whole area). That is, in this embodiment, the annular abutting portion 20, the flange 33 and the support section 26 are so disposed as to overlap one another in an axial direction of the cup 18 (i.e., in an up and down direction). The thickness T3 of the flange 33 (i.e., the thickness in an up and down direction), which is smaller than the thickness T2 of the basal portion 26b of the support section 26 as described above, is so determined as not to cause such breakage that would otherwise be likely to occur when coupling the cup 18 and the holder section 23 by the caulking section 28.

The cover section 35 is located beneath the support section 26 and below the set-in portion 32, and covers the conductive pins 13c at an outside of the pins 13c in a direction perpendicular to the cup or housing body 18. The cover section 35 is formed generally into a cylinder closed at the top and opened at the bottom such that lower ends of the conductive pins 13c are exposed. About half of an upper area of the cover section 35 is covered by the outer cylinder section 25 of the holder body 24. Although a reference numeral is not assigned, the cover section 35 includes on the inner circumference of a vicinity of the bottom a recessed portion which is engageable with a projection of the connector having lead wires (not-shown). The joint portion 36 is so formed as to bridge the set-in portion 32 and cover section 35, and covers up upper regions of the conductive pins 13c without forming any gaps while filling in the opening 26c of the support section 26 of the holder body 24. The molded section 31 of the illustrated embodiment is molded by insert molding using the squib 13 and the holder body 24 as inserts, thus the molded section 31, the holder body 24 and the squib 13 are provided in an integral fashion.

The molded section 31 of this specific embodiment is fabricated of such synthetic resin as polyamide (e.g., nylon 6,6, nylon 6) containing glass fiber. The synthetic resin used to form the molded section 31 should not be limited to polyamide resin, but may also be such resin having low modulus of longitudinal elasticity (Young's modulus) as to be elastically deformable at caulking of the caulking section 28, when a downward pressure is applied along the axial direction of the cup 18 (i.e., in an up and down direction), and be restorable after caulking while keeping a caulked state of the caulking section 28. Specifically, the modulus of longitudinal elasticity (Young's modulus) is desirably not over 20 GPa (desirably within a range of 5 to 15 GPa). In the embodiment, moreover, the molded section 31 is desirably flame retardant because it is exposed to flame at combustion of the gas generating charge 15, and is required to be molded from thermoplastic resin since it is integrally molded with the squib 13 and holder body 24 by insert molding. Taking these points into consideration, a polyamide resin containing glass fiber is used to mold the molded section 31 of the illustrated embodiment. More specifically, the polyamide resin is nylon 6,6 containing 30 weight percent glass fiber.

The actuator S1 is manufactured as follows: Firstly, the holder body 24 and the squib 13 are placed in an unillustrated mold, and a molten synthetic resin is poured into the mold from a gate G (indicated by double-dashed lines in FIG. 2) so it fills a cavity formed between the holder body 24 and squib 13. The synthetic resin is solidified, thereby forming the molded section 31 integral with the holder body 24 and the squib 13. In this embodiment, the gate G for feeding the synthetic resin into the mold is located to face the top face of the set-in portion 32 at a lateral of the igniter 13a so as to dispense with deburring after molding. If such an advantageous effect does not have to be considered, the gate may also be located on the inner circumference of the cover section of the molded section. The mold used to mold the molded section 31 is comprised of a first split mold having at least two sections for forming the outer circumference and a second split mold having at least two sections with a slide core for forming the inner circumference of the cover section 35.

Thereafter, the cup 18 filled with the gas generating charge 15 is placed on the holder section 23 such that the annular abutting portion 20 of the cup 18 abuts against the flange 33 of the holder 23. Then the leading end or upper end portion 29a of the caulkable potion 29 protruding upward relative to the annular abutting portion 20 is caulked with a downward pressure (i.e., a pressure acting along an axial direction of the cup 18 or towards the holder section 23), thereby forming the caulking section 28 or coupling means CM, and coupling the holder section 23 and cup 18 together. Thus the actuator S1 is completed. The actuator S1 thus manufactured is housed inside the casing 9 extending from the gas vessel 3 filled with a pressurized gas, and the leading end or lower end of the casing 9 is caulked or crimped to the holder body 24. Thus the actuator S1 is mounted on the inflator 1.

After the inflator 1 equipped with the actuator S1 is mounted on a vehicle as part of an airbag apparatus, when an actuating signal is fed to the squib 13 of the actuator S1 via a lead wire, the igniter 13a of the squib 13 is ignited and burns the gas generating charge 15 filling in the cup 18, thereby generating a combustion gas. In the meantime, the tearable portions formed on the ceiling wall 21 of the cup 18 are torn so the areas of the ceiling wall 21 in between the tearable portions open, such that the combustion gas generated by combustion of the gas generating charge 15 fills up the casing 9 and increases an inner pressure of the casing 9. Thus the burst disc 10 partitioning the casing 9 from the gas vessel 3 collapses, which allows the combustion gas to flow into the gas vessel 3. Then the combustion gas heats the pressurized gas in the gas vessel 3 and increases an inner pressure of the gas vessel 3, thereby collapsing the burst disc 7 that closes off the end cap section 4 of the gas vessel 3. Thus the combustion gas and pressurized gas are fed into an airbag from the gas discharge ports 5 of the end cap section 4 for inflating the airbag.

In the actuator or gas generator S1 for use in the inflator 1, the holder body 24 is provided with the support section 26 that protrudes inwardly from an entire inner circumference of the outer cylinder section 25 in a continuous manner for supporting the igniter 13a of the squib 13, and the support section 26 has such a sectional contour as to taper toward the leading end 26a as taken along the axial direction of the cup or housing body 18. This configuration will help secure a greater clearance between the support section 26 and igniter 13a (the region indicated at t1 in Fig .3) at integral molding of the molded section 31 together with the squib 13 and holder body 24, in comparison with an instance where a thickness of the support section is uniform over an entire length. This will facilitate a resin fed into a mold from the gate G located at an end face in an axial direction (i.e., in an up and down direction) of the cup 18 (i.e., on the top face of the set-in portion 32, in the illustrated embodiment) to flow through narrow regions of a cavity, e.g., between the support section 26 and igniter 13a (i.e., the region at t1), between the leading end 26a of the support section 26 and the conductive pin 13c in the opening 26c (i.e. a region indicated at t2 in FIG. 3), thereby lessening defective moldings as much as possible. Further, the tapering contour of the support section 26 and a greater clearance t1 formed between the support section 26 and igniter 13a will allow the opening 26c of the support section 26 to be minified in comparison with an instance where a thickness of the support section is uniform over an entire length. In other words, the support section 26 will be allowed to protrude inwardly as much as possible. Accordingly, the support section 26 thus constructed from metal will securely support the igniter 13a of the squib 13 which will attempt to move away from the gas generating charge 15 by a reaction at actuation.

Therefore, the actuator S1 of the inflator 1 described above can prevent defective moldings as much as possible and work in a steady fashion in spite of the integral construction of the molded section 31, the holder body 24 and the squib 13.

Moreover, the cup or housing body 18 includes the annular abutting portion 20 facing toward the holder section 23 for abutment against the holder section 23 whereas the molded section 31 includes the flange 33 at a location overlapping with the support section 26 in the axial direction of the cup 18 and proximate the set-in portion 32, and the cup 18 is coupled with the holder section 23 by coupling means CM that presses the annular abutting portion 20 towards the holder section 23 along the axial direction of the cup 18 so as to make a plane of the annular abutting portion 20 facing toward the holder section 23 abut against a plane of the flange 33 facing toward the gas generating charge 15 over entire circumferences. With this configuration, if an intense pressure is applied to the flange 33 when coupling the cup 18 and holder section 23 by the coupling means CM or caulking section 28 (i.e., by pressing the annular abutting portion 20 towards the holder section 23), the flange 33 is merely elastically deformed in comparison with the holder body 24 and annular abutting portion 20.

That is, even if the flange 33 is deformed when pressed by the annular abutting portion 20, it restores after caulking in such a manner as to fill a clearance between the flange 33 and annular abutting portion 20, while keeping the coupled state by the coupling means CM (i.e., the caulked state by the caulking section 28), thereby preventing a clearance from being formed between the annular abutting portion 20 and flange 33 as much as possible. Furthermore, since the support section 26, the annular abutting portion 20 and flange 33 are so disposed as to overlap one another in an axial direction of the cup 18, the flange 33 is supported by the support section 26. This configuration will help prevent the flange 33 from being pressed excessively by the pressure that presses the annular abutting potion 20 at coupling of the holder section 23 and cup 18 by the coupling means CM, thereby improving coupling workability by the coupling means CM (i.e., a caulking workability by the caulking section 28).

That is, the flange 33 acts like an O-ring, such that a clearance or a gap is not likely to be formed between the flange 33 and the annular abutting portion 20 of the cup 18 or between the flange 33 and support section 26 of the holder section 23, and therefore a gap is not likely to be formed between the cup 18 and holder section 23, thereby improving sealedness of the housing 17. As a result, the gas generator S1 of the embodiment is capable of shutting out moisture and keeping the gas generating charge 15 in good combustible condition for an extended time period.

Moreover, the coupling means CM in the foregoing embodiment is comprised of the caulking section 28 that extends from a vicinity of the support section 26 of the holder section 23 or holder body 24 and caulked to the cup 18. The caulking section 28 is so arranged as to cover the back face (i.e., top face 20b) of an outer periphery of the annular abutting portion 20 generally all over and is pressed against the top face 20b along the axial direction of the cup 18 (i.e., along an up and down direction). The caulking section 28 is easily formed by providing on the holder section 23 a caulkable portion 29 extending from the vicinity of the support section 26 and arranging the caulkable portion 29 to cover the back face or top face 20b of the outer periphery of the annular abutting section 20 generally all over and caulking or pressing the caulkable portion 29 along the axial direction of the cup 18 (in an up and down direction). Accordingly, coupling of the cup 18 with the holder section 23 will not need high dimensional accuracy, thereby enabling to manufacture the actuator S1 at low cost. If such an advantageous effect does not have to be considered, the cup and holder section may be coupled together by screw coupling, e.g., by providing male screws on an outer circumference of the annular abutting portion of the cup while providing female screws on an inner circumference of the outer cylinder section of the holder body. Furthermore, since the thickness T2 of the basal portion 26b of the support section 26 in the axial direction of the cup 18 (i.e., in an up and down direction) is greater than the thickness T3 of the flange 33 in an up and down direction, the support section 26 supports the flange 33 in a steady fashion when coupling the cup 18 and holder section 23 together by the caulking section 28.

Figure 4:
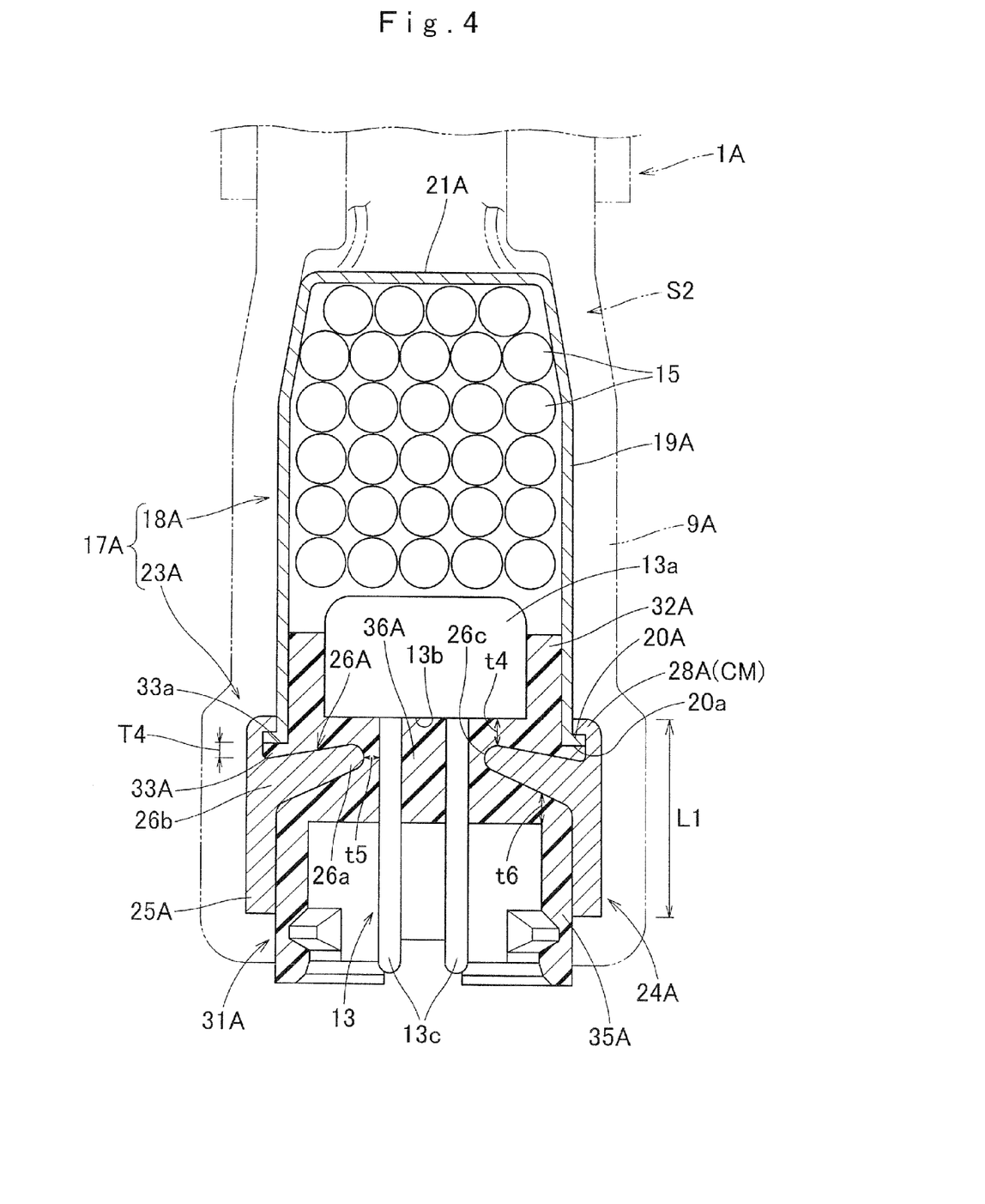
FIG. 4 is a schematic vertical section of an alternative embodiment (an actuator) of the invention.

An alternative embodiment of the actuator S2 is now described referring to FIG. 4. The actuator S2 has a similar structure to the aforedescribed actuator S1 except a cup 18A and a holder section 23A for forming a housing 17A, and therefore, detailed descriptions of common members will be omitted while assigning common reference numerals to them. The holder section 23A has a similar structure to the holder section 23 of the foregoing embodiment except in outer contour of a supporting section 26A of a holder body 24A, location of a caulking section 28A in an up and down direction, and outer contour of a molded section 31A, and therefore, detailed descriptions of common members will be omitted while assigning "A" at the ends of their reference numerals.

Taken along an axial direction of the cup or housing body 18A (i.e., in an up and down direction), the support section 26A of the actuator S2 has such a sectional contour as to turn upward, toward the gas generating charge 15, as well as taper toward the leading end 26a. In other words, the basal portion 26b of the support section 26A is at a lower location than that of the actuator S1, away from the gas generating charge 15. This configuration of the holder section 23A of the actuator S2 enables an annular abutting portion 20A of the cup 18A and a caulking section 28A to be located at lower positions in comparison to the actuator S1 insofar as a flange 33A supported by the basal portion 26b of the support section 26A secures a certain thickness. In the actuator S2, the lower face 20a of the annular abutting portion 20A (i.e., the top face 33a of the flange 33A) is located at a lower position than the lower face 13b of the igniter 13a, and the top face of the caulking section 28A generally conforms to the lower face 13b of the igniter 13a in location in an up and down direction. The thickness T4 in an up and down direction of the flange 33A of the actuator S2 is smaller than the thickness T3 of the flange 33 of the actuator S1, but so determined as to be capable of preventing damages even at caulking by the caulking section 28A. Further, the cup 18A is greater in length in an up and down direction of the circumferential wall 19A than the cup 18 of the actuator S1 by a difference in location in an up and down direction between the annular abutting portions of the actuator S2 and actuator S1.

Similarly to the actuator S1, an area to the leading end 26a of the support section 26A is located beneath the igniter 13a so as to support the igniter 13a, and an outer circumference of the support section 26A is covered by a molded section 31A all over. A clearance t4 (FIG. 4) between the support section 26A and igniter 13a, a clearance t5 between the leading end 26a of the support section 26A and the conductive pin 13c (or a diameter of the opening 26c) and a clearance t6 between the support section 26A and an inner surface of a cover section 35A of the molded section 31A are respectively determined at minimum dimensions that can assure smooth resin flow at molding of the molded section 31A. The clearances t4, t5 and t6 are generally identical to the clearances t1, t2 and t3 of the actuator S1 of the foregoing embodiment. The cover section 35A of the actuator S2 is so configured that a protruding amount of the conductive pins 13b from the cover section 35A is identical to that in the actuator S1.

The configuration of the actuator (or gas generator) S2 thus described will allow the basal portion 26b of the support section 26A to be located at a lower position away from the gas generating charge 15 (or housing body) relative to the holder body 24A according to a slanting amount of the support section 26A, in comparison with an instance where the support section 26 is formed to extend perpendicularly to the axial direction of the cup 18 as in the actuator S1. Accordingly, the location of the caulking section 28A relative to the squib 13 in the actuator S2 will be lower than that in the actuator S1, and an area in the outer circumference of the squib 13 covered by the holder body 24A in the actuator S2 will be less than that in the actuator S1. As a result, the length L1 (FIG. 4) of the holder body 24 in an axial direction of the cup 18 (or in an up and down direction) may be shorter than a length L2 (FIG. 2) in an up and direction of the holder body 24 of the actuator S1. Therefore, the actuator S2 can be suitably stored in such a casing as a casing 9A of an inflator 1A as indicated by double-dashed lines in FIG. 4, in which a portion with a greater diameter for housing the holder section is shorter in comparison to the casing 9 shown in FIG. 1. To the contrary, a length of a holder body in an up and down direction will be increased if the support section is turned down toward the cover section. That is, the dimension of the holder body 24/24A in an up and down direction (or in an axial direction of the cup 18) can be easily adjusted according to an outer contour of an inflator by changing a slanting angle of the support section 26/26A relative to a direction perpendicular to an axial direction of the cup 18.

Moreover, in the actuator S2 as well, the flange 33A may be deformed when pressed by the annular abutting portion 20A, but after the holder section 23A and cup 18A are coupled together, it restores in such a manner as to fill a clearance between the flange 33A and annular abutting portion 20A while keeping the caulked state by the caulking section 28A, thereby preventing a clearance from being formed between the annular abutting portion 20A and flange 33A as much as possible. That is, the flange 33A acts like an O-ring, too, such that a clearance or a gap is not likely to be formed between the flange 33A and the annular abutting portion 20A of the cup 18A or between the flange 33A and support section 26A of the holder section 23A, and therefore a gap is not likely to be formed between the cup 18 and holder section 23A, thereby improving sealedness of a housing 17A.

Although the invention has been described as applied to an actuator for use in an inflator, the application of the present invention should not be limited thereby. The invention may also be applied to a micro gas generator, an actuator for use in a pyrotechnic inflator, and so on. Among others, the gas generator of the invention will be suitably used as an actuator for use in such an inflator as the inflator 1 of the foregoing embodiment wherein a combustion gas generated by combustion of the gas generating charge 15 collapses a burst disc 10 that partitions the casing 9 from the gas vessel 3 since the support section 26/26A will steadily support the igniter 13a of the squib 13 which will attempt to move away from the gas generating charge 15 due to an increased inner pressure of the casing 9.

What is claimed is:

1. A gas generator comprising:
a housing body that houses a gas generating charge, the housing body being made from metal and generally tubular in contour;
a squib that includes an igniter facing towards the gas generating charge for igniting the gas generating charge in order to generate a combustion gas and a pair of conductive pins extending generally along an axial direction of the housing body from the igniter; and
a holder section that holds the squib and includes:
a holder body made of metal and including
an outer cylinder section that is generally tubular in contour and constitutes an outer circumferential region of the holder section, and
a support section that protrudes inwardly from an entire inner circumference of the outer cylinder section in a continuous manner for supporting the igniter of the squib, the support section having a sectional contour that tapers towards a leading end thereof, the tapering occurring in the axial direction of the housing body as the sectional contour progresses inward toward the leading end; and
a molded section that is located between the holder body and the squib and covered by the outer cylinder section of the holder body, the molded section being molded from synthetic resin to be integral with the holder body and the squib, and covering an outer surface of the support section allover and including:
a set-in portion that holds the igniter and covers an outer circumference of the igniter generally all over in a closely contacting fashion except a region of the igniter facing towards the gas generating charge; and
a cover section that is located on an opposite side of the set-in portion relative to the support section and generally tubular in contour, the cover section covering the conductive pins on an outside of the pins in a direction perpendicular to the axial direction of the housing body, wherein:
the housing body includes an annular abutting portion facing toward the holder section for abutment against and coupling with the holder section;
the molded section includes a flange at a location overlapping with the support section in the axial direction of the housing body and proximate the set-in portion; and
the housing body is coupled with the holder section by coupling means that presses the annular abutting portion towards the holder section along the axial direction of the housing body so as to make a plane of the annular abutting portion facing toward the holder section abut against a plane of the flange facing toward the gas generating charge over entire circumferences.

2. The gas generator of claim 1, wherein:
a thickness of a basal portion of the support section in the axial direction of the housing body is greater than a thickness of the flange in the axial direction of the housing body; and
the coupling means is comprised of a caulking section that extends from a vicinity of the support section of the holder body and caulked to the housing body, the caulking section covering a back face of an outer periphery of the annular abutting portion generally all over and be pressed against the back face along the axial direction of the housing body so as to overlap with the annular abutting section in the axial direction of the housing body.

3. The gas generator of claim 2 wherein
the support section is so slanted as to turn the leading end toward the gas generating charge.

4. The gas generator of claim 1 wherein
the combustion gas generated by combustion of the gas generating charge collapses a burst disc of an inflator on which the gas generator is mounted as an actuator.

5. The gas generator of claim 1 wherein
the flange of the molded portion is disposed so as to intervene between the support section and the housing body such that housing body does not directly contact the support section.

* * * * *